Aug. 1, 1933. P. C. SWOLE 1,920,441
SELF CLOSING OUTLET FITTING FOR AIR GAUGES
Filed Feb. 1, 1932
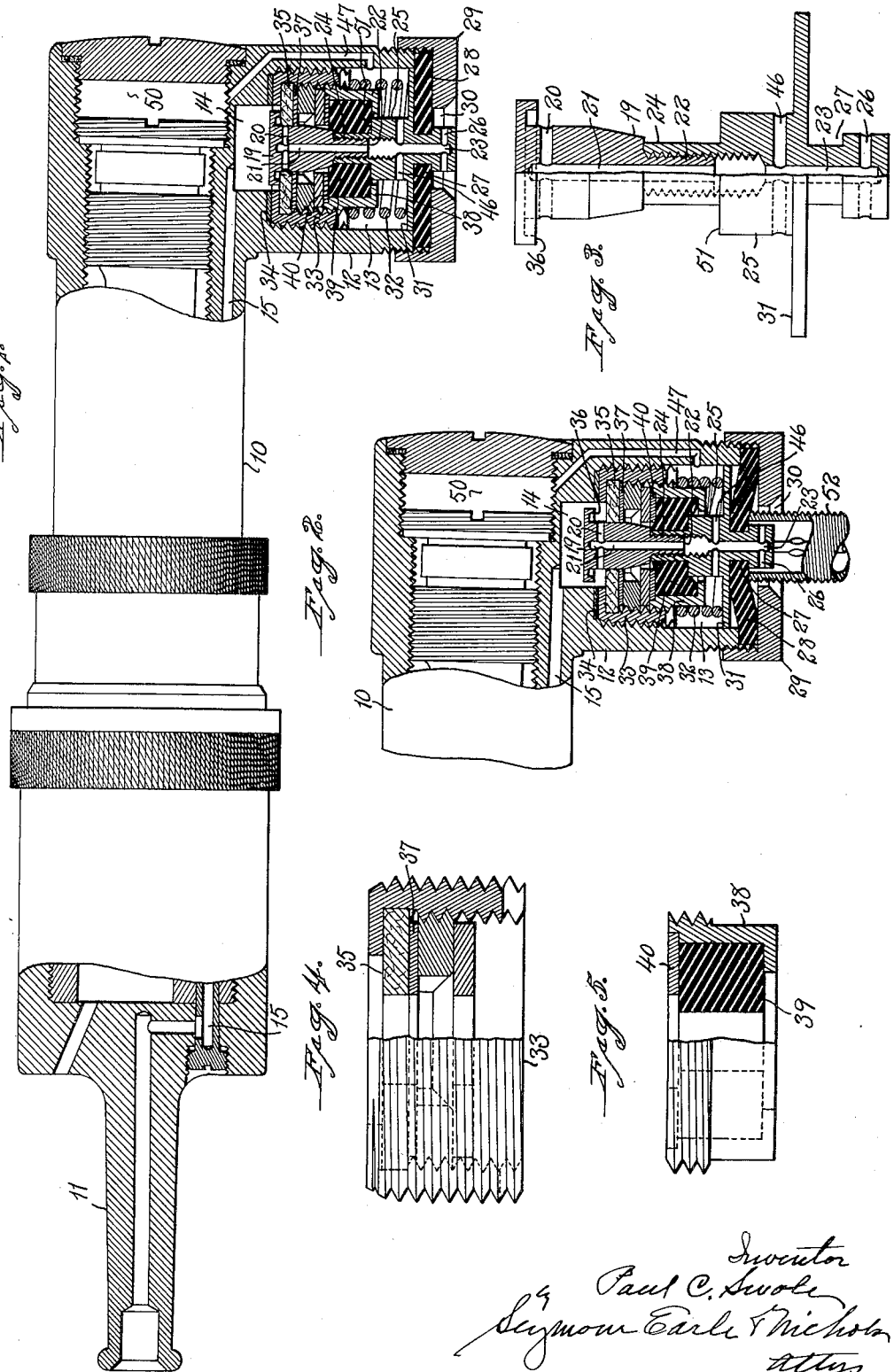

Patented Aug. 1, 1933

1,920,441

UNITED STATES PATENT OFFICE 1,920,441

SELF-CLOSING OUTLET-FITTING FOR AIR-GAUGES

Paul C. Swole, Clinton, Conn.

Application February 1, 1932. Serial No. 590,101

3 Claims. (Cl. 284—17)

This invention relates to improvement in self-closing outlet-fittings for air-gauges commonly known as air-chucks and designed for use as terminal-fittings for air-hose used in connection with the inflating of tires, although not so limited. The object of this invention is to provide a self-closing outlet-fitting which will respond quickly in action and provide a tight fitting of the valve-mechanism with the tire-valve and is an improvement on the construction shown and described in Letters Patent No. 1,850,111, dated March 22, 1932, to Frank N. Kelsey. The invention consists in the construction as hereinafter described and particularly recited in the claims.

In the accompanying drawing:

Fig. 1 is a side view, partly in section, of a combined air-gauge and self-closing outlet-fitting, illustrating my invention and showing the valve in its closed position;

Fig. 2 is a similar view showing the valve in its open position;

Fig. 3 is a side view, partly in section, of the valve-structure, detached;

Fig. 4 is a side view partly in section of the valve-bushing; and

Fig. 5 is a side view partly in section of the clamping-cup.

My improved self-closing outlet-fitting is used in connection with a tubular body-member 10 which is provided at one end with a nipple 11 for connection with a source of air-pressure. The construction of this body-member may follow the construction shown and described in the said Kelsey application, although not necessarily limited thereto. At the outer end of the said body-member is a short tubular neck 12 off-setting from it at a right angle and formed with an axial chamber 13 and with a recess 14 which connects with a passage-way 15 extending through the nipple 11. The egress of the air from the recess 14 is controlled by a reciprocating outlet-valve plunger 19 having a radial port 20 intersecting an axial passage 21 opening through the outer end of the externally-threaded stem 22 of the said valve-plunger and adapted to conduct air to an aligned axial passage 23 formed in the internally-threaded shank 24 of an outlet-valve extension-member 25 having its extreme outer ends provided with two radial outlet-ports 26 leading outward from the axial passage 23 aforesaid.

Near its outer end the extension-member 25 is formed with an annular recess 27 receiving the inner edge of a washer-like flexible diaphragm 28 which has its outer edge pinched between the outer face of the neck 12 and a cap 29 threaded thereon and provided with a central clearance passage 30 surrounding the extreme outer end of the outlet-valve extension-member 25.

Directly back of the diaphragm 28 the extension-member 25 is formed with a disk-like annular flange 31 which backs up said diaphragm and is adapted to reciprocate within the chamber 13 in the neck 12 aforesaid. The flange 31 forms a seat for the outer end of a helical spring 32 located in said chamber and encircling the said valve extension-member and bearing at its inner end against the outer face of a cup-shaped bushing 33, externally threaded for engagement with threads formed internally within the chamber 13 and seated against a metal washer 34. Positioned within the cup-shaped bushing 33 is a fibrous disk-like valve-seat 35 through which the valve-plunger 19 extends and which is adapted to be engaged by the overhanging head 36 thereof to prevent the escape of air outward from the recess 14. The said head 36 is normally maintained against the inner face of the seat 35 by the tension of the helical spring 32.

Bearing against the outer face of the valve-seat 35 is a metallic washer 37 which is interposed between the same and the inner edge of a packing-cup 38 in which a packing 39 of rubber or other suitable material is located, and this packing-cup 38 is backed up by a metal washer 40 resting on the packing 39 located in the cup 38, which is threaded into the bushing 33. The plunger 19 extends through the cup-shaped bushing 33 and the stem 24 passes through the packing 39, a shoulder 51 on the extension 25 being seated against the outer face of the packing 39, by which the packing is compressed when the valve-plunger is moved inward to its open position so as to prevent leakage around the valve-stem.

Leading radially outward from the bore 23 in the outlet-valve extension-member 25 is a by-pass channel 46 opening into the chamber 13. In the neck 12 is a by-pass 47 opening from the chamber 13 into a chamber 50 formed in the extreme forward end of the body-member 10. When the valve-plunger 19 is pushed inward, as will hereinafter appear, air is forced outward through the by-pass channel 46 into the chamber 13 and through the by-pass port 47 in the neck 12 and into the chamber 50.

In the use of my improved fitting, the neck 12 is slipped over a tire-nipple 52 which projects inward through the clearance-opening therein and has its upper end engaged with the under-face of the diaphragm 28. At this time the extreme outer end of the outlet-valve extension-member 25 engages the usual valve-stem of the tire-nipple and opens the valve therein in the usual way to permit the passage of air into the tire to which said nipple is attached. The entry of the tire-valve nipple into the outer end of the neck 12 forces the diaphragm inward and with it the outlet-valve extension-member 25 and the outlet-valve plunger 19. This movement moves the parts from the positions shown in Fig. 1, lifts the valve-head clear of its seat to the positions shown in Fig. 2, and permits air to flow into the tire-valve nipple via the passages 20 and 21. Coincidental with the opening of the valve to permit the flow of air into the tire-valve nipple as above described, air is also permitted to flow outward through the by-pass channel 46 and by-pass port 47 and into the chamber 50.

I claim:

1. A self-closing outlet-fitting for air-gauges, comprising a tubular neck, a bushing-cap having threaded engagement with said neck, a valve-seat in said bushing-cup, a packing-cup threaded into said bushing-cup, a compressible packing in said packing-cup, a valve-plunger formed with a head to engage the valve-seat and having a bearing on the inner end of said packing, a valve-extension connected with said plunger and formed with a shoulder bearing on the outer end of said packing, and an axial passage through said stem and extension into said head, and a radial passage intersecting the said axial passage within said head.

2. A self-closing outlet-fitting for air-gauges, comprising a tubular neck, a bushing-cup having threaded engagement with said neck, a valve-seat in said bushing-cup, a packing-cup threaded into said bushing-cup, a compressible packing in said packing-cup, a valve-plunger formed with an overhanging head to engage the valve-seat and having a bearing on the inner end of said packing, a valve-extension connected with said plunger and formed with a shoulder bearing on the outer end of said packing, an axial passage through said stem and extension into said head, and a radial passage intersecting the said axial passage within said head.

3. A self-closing outlet-fitting for air-gauges, comprising a tubular neck, a bushing-cup having threaded engagement with said neck, a valve-seat in said bushing-cup, a packing-cup threaded into said bushing-cup, a compressible packing in said packing-cup, a washer seated in said packing-cup over said packing, a valve-plunger formed with a head to engage the valve-seat and having a bearing on the inner end of said packing, a valve-extension connected with said plunger and formed with a shoulder bearing on the outer end of said packing, an axial passage through said stem and extension into said head, and a radial passage intersecting the said axial passage within said head.

PAUL C. SWOLE.